May 15, 1962 L. R. PADBERG, JR., ET AL 3,035,245
ECHO RANGING SYSTEM
Filed April 27, 1955

INVENTOR.
LOUIS R. PADBERG, JR
FEDERICK D. PARKER
BY MILTON D. PAPINEAU

ATTORNEYS

3,035,245
ECHO RANGING SYSTEM
Louis R. Padberg, Jr., 4126 Middlesex Drive, Frederick
D. Parker, 3784 Brems St., and Milton D. Papineau,
2303 Cecilia Terrace, all of San Diego, Calif.
Filed Apr. 27, 1955, Ser. No. 504,390
1 Claim. (Cl. 340—3)
(Granted under Title 35, U.S. Code (1952), sec. 266)

The invention described herein may be manufactured and used by or for the Government of the United States of America for governmental purposes without the payment of any royalties thereon or therefor.

This invention relates to an echo ranging system and more particularly to apparatus for displaying echoes of low frequency high power short pulses of acoustic energy which are reflected from an underwater object.

The range of high power sonar equipment is limited by normal transmission losses and is further restricted by reverberation and cavitation which are factors closely related to pulse length. Such equipment commonly embodies a 24 kc. transducer and displays such as a Plan Position Indicator and Bearing Deviation Indicator. With this type of apparatus there is obtained poor range information, and definition and no information concerning the details of the echo shape while aural presentation of short echo pulses is not satisfactory.

The present invention comprises means for generating and transmitting high power short pulses of low fixed frequency, a receiver for feeding filtered and amplified echo pulses to a bearing deviation indicator, an A-scan oscilloscope, a loud speaker and a recorder while a fast sweep expanded A-scan oscilloscope for displaying echo pulses at carrier frequency is fed with unfiltered echoes. The recorder incorporates means for keying the pulse generator and the A-scan oscilloscope and means for gating the expanded oscilloscope and the bearing deviation indicator.

It is an object of this invention to provide an echo ranging system having increased range and definition.

A further object of this invention is the provision of an echo ranging system which utilizes high power short pulses of low fixed frequency.

Another object of this invention is to provide improved means for displaying acoustic energy echoes.

Still another object of this invention is the provision of means for enhancing the aural presentation of short pulse echoes.

A further object of this invention is to provide an echo ranging system which will provide information concerning the details of the echo pulse shape.

A still further object of this invention is the provision of means for minimizing the effects of reverberation in the display section of an echo ranging system.

Other objects and many of the attendant advantages of this invention will be readily appreciated as the same becomes better understood by reference to the following detailed description when considered in connection with the accompanying drawings wherein.

Figure 2:
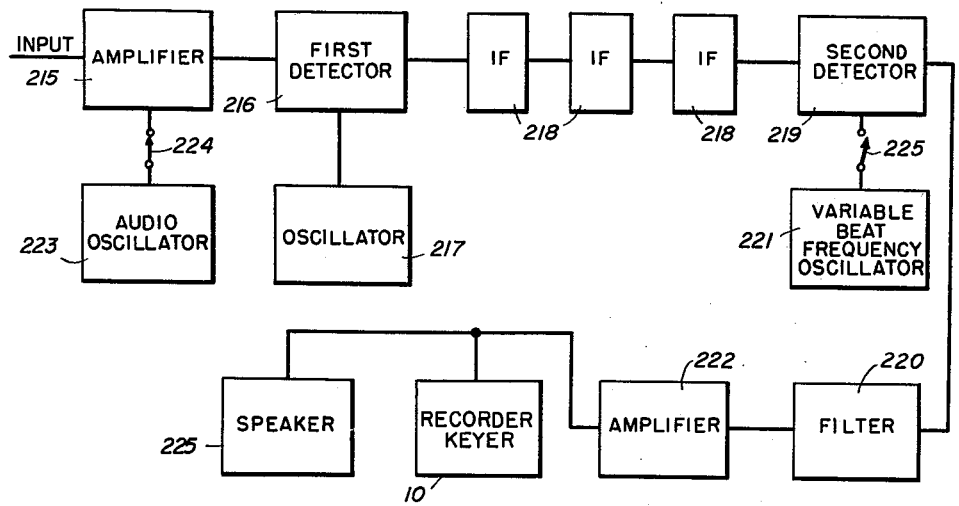
FIG. 2 is a block diagram of the receiver.
Figure 1:
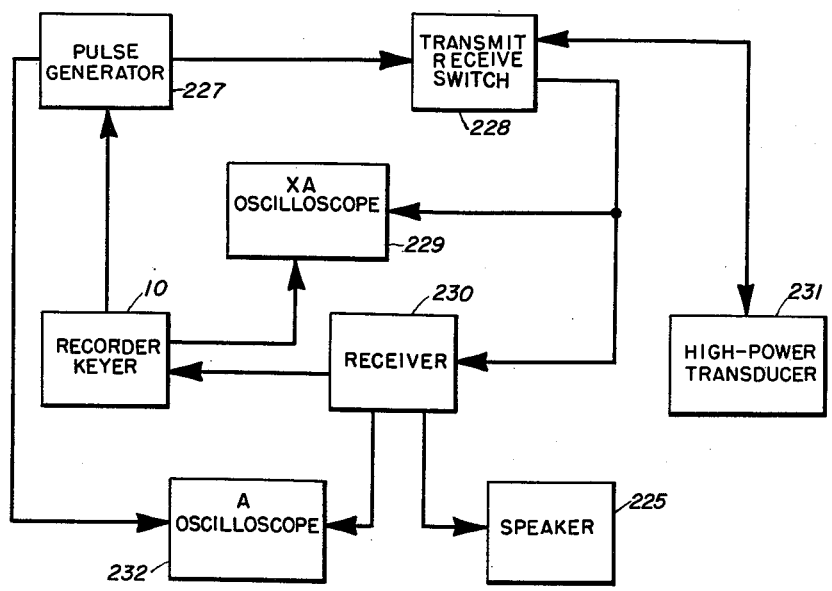
FIG. 1 is a block diagram of the echo ranging system.

The pulse generator 227 is the type described in the U.S. Patent No. 2,948,879 of Louis R. Padberg, Jr. et al. for High Power Short Pulse Transmitting Apparatus, issued August 9, 1960, and comprises a multivibrator for generating a train of gating pulses of predetermined length, a crystal stabilized oscillator, a mixer controlled by the gating pulses for passing the output of the oscillator as a train of signal pulses of fixed length and frequency, a multivibrator for generating a train of timing pulses of greater length than the signal pulse length for cyclically operating the transmit receive switch 228, means for keying both multivibrators at a desired repetition rate and means for delaying the gating pulses relative to the timing pulses whereby a preformed signal pulse arrives at the transmit receive switch 228 at the proper point in the relay cycle. The signal pulse which is preferably 15 kc. or less is of a length less than 10 milliseconds and has a power level up to 140 kilowatts. The pulse is passed by the transmit receive switch 228 to the transducer 231 which is a high power transmitting and receiving magnetostrictive transducer of the type described in U.S. Patent No. 2,961,638 to Louis R. Padberg, Jr. for Magnetostrictive Electro-Acoustical Transducer, issued November 22, 1960. Due to its large radiating face area and operation with short pulses this transducer effectively minimizes the undesired cavitation effects. The transducer 231, resonant at the signal frequency, converts the electrical energy pulses to transmitted acoustic energy pulses, receives echoes of such pulses reflected from objects in the path thereof and converts the acoustic energy echo pulses to electrical energy signals. The echo signals or pulses are fed through the transmit receive switch 228, which alternately couples the transducer 231 with the receiver 230 and with the pulse generator 227, to the receiver 230 where they are detected, filtered, modulated and amplified and thence are applied to the speaker 225, the A-scan oscilloscope 232 and the recorder 10.

The recorder 10 is of the type described in the United States Patent No. 2,892,666, issued July 2, 1959 to Frederick D. Parker and Louis R. Padberg, Jr.

The receiver 230 shown in FIG. 2 is a U.S. Navy standard model 755 or CBM-46061-B superheterodyne receiver to which an audio frequency modulator has been added to minimize reverberation and to enhance the tonal qualities of short pulses. This receiver may be operated beyond its designed frequency range by obvious modification of the front end. Incoming pulses at a carrier frequency of 15 kc., for example, are amplified in the first amplification stage 215 and mixed in the first detector 216 with the output of oscillator stage 217 to produce a signal of 60 kc., for example, which is amplified in several intermediate frequency stages 218 of variable band width and then mixed in the second detector 219 with the variable frequency output of the beat frequency oscillator stage 221 to produce a signal of from 0 to 1600 c.p.s. This signal is filtered by filters 220 and passed through a stage of audio amplification 222 to the speaker 225, recorder 10 and A oscilloscope 232. The 800 c.p.s. oscillator 223 is coupled to the screen grid of stage 215 through a switch 224 which is mechanically coupled with the switch 225 coupling oscillator 221 with the second detector 219 so that closing of switch 224 opens switch 225 and vice versa. The oscillator 223 amplitude modulates the carrier frequency signal at an audio frequency thus enhancing the tonal quality of the signal presented by the speaker 225. However, the most important effect of the oscillator 223 is its reduction of reverberation. Reverberation is a composite reception of the unwanted echoes from the multitudinous small objects in the water such as plant life, small fish, etc. These echoes are of extremely short duration and thus will not be modulated by the oscillator 223 which effects only the relatively long target pulses. The oscillator 223 may be used successfully even with short transmitted pulses when the echo source is relatively large since a large irregular echoe source will tend to stretch the short pulse to a length which allows the 800 c.p.s. modulation to be effective. For example, it has been found that a one milli-second transmitted pulse will be reflected from irregular objects of several hundred feet in dimension as an echo pulse of up to 100 milliseconds. With oscillator 223 connected and beat frequency oscillator 221 disconnected the sharp low pass receiver filters 220 located at the output of the second detector 219 are adjusted to pass only the 800 cycle signal. In this instance the second detector operates as a square law detector which is known to be a good detector of weak signals and little of the unwanted reverberation echoes are fed to the audio stage 222 so that the net result is a signal having an excellent signal to background ratio. This elimination of reverberation effects provides a gretaly improved presentation on the recorder 10, the A oscilloscope 232 and the speaker 225.

It has been found that much information concerning various physical characteristics of the echo source can be obtained from observation of the details of the echo pulse. This information is available only from an undistorted echo pulse and therefore would be lost if the echo is passed through the heterodyning and filtering receiver. Thus the expanded XA oscilloscope assembly 229 embodies its own linear amplification and is supplied with the non-distorted echo signal at carrier frequency. This signal may be supplied to XA oscilloscope 229 directly from the transducer 231 (through the transmit receive switch 228) or may conveniently be taken from the output of the first amplification stage 215 of the receiver in order to avoid the distortion introduced in the receiver 230.

Obviously many modifications and variations of the present invention are possible in the light of the above teachings. It is therefore to be understood that within the scope of the appended claims the invention may be practiced otherwise than as specifically described.

What is claimed is:

Apparatus for use with underwater detection equipment of the type employing a signal generator for generating acoustic energy pulses of a predetermined carrier frequency, echo range indicating means, a transducer, and an expanded A-scope directly coupled with said transducer for displaying an echo in an enlarged scale; the apparatus comprising means for coupling said transducer with said range indicating means, said coupling means including an amplitude modulator having an input coupled to the transducer output, a fixed frequency audio signal generator coupled to a second modulator input for amplitude modulating carrier frequency signals supplied to the modulator by the transducer, a superheterodyne receiver coupled to the modulator output, and an audio filter having an input coupled to the receiver output and an output coupled to said echo range indicating means, said filter being transmissive only at the predetermined frequency of said audio signal generator whereby said indicating means is responsive only to signals of said predetermined frequency, and said predetermined frequency having a wave of sufficient length for modulating only such echo pulses as are approximately as long in duration as the echo pulses received from underwater objects approaching in size the objects to be detected.

References Cited in the file of this patent

UNITED STATES PATENTS

| | | |
|---|---|---|
| 2,436,377 | Briggs et al. | Feb. 24, 1948 |
| 2,475,363 | Turner | July 5, 1949 |
| 2,757,354 | Bolzmann | July 31, 1956 |
| 2,788,509 | Bolzmann | Apr. 9, 1957 |

FOREIGN PATENTS

| | | |
|---|---|---|
| 1,027,967 | France | Feb. 25, 1953 |
| 1,071,853 | France | Mar. 10, 1954 |

OTHER REFERENCES

"Submarine Detection by Sonar," A. C. Keller, Transactions of A.I.E.E., vol. 66, pp. 1217–1230, 1947, or Bell Technical Publication, Monograph B–1543.

"Echo Ranging Sonar," Electronics, August 1946, pp. 88–93.